United States Patent [19]

Santana

[11] Patent Number: 5,452,554
[45] Date of Patent: Sep. 26, 1995

[54] MODULAR FURNITURE CONSTRUCTION

[76] Inventor: Arturo P. Santana, Urbanizacion Santa Marta, Calle "C", Quinta "Coco", Caracas, Distrito Federal, Venezuela

[21] Appl. No.: 177,136

[22] Filed: Jan. 4, 1994

[51] Int. Cl.$^6$ ............................... A47B 97/00; E04H 1/00
[52] U.S. Cl. ..................... 52/582.2; 52/656.9; 403/321
[58] Field of Search ............................. 52/582.2, 127.7, 52/127.8, 656.9; 403/321, 322, 353

[56] References Cited

U.S. PATENT DOCUMENTS 3,664,073  5/1972  Tucker ................................. 52/127.7
4,129,395  12/1978  Theurer et al. .................... 403/353 X Primary Examiner—Carl D. Friedman
Assistant Examiner—Robert J. Canfield
Attorney, Agent, or Firm—Hoffman, Wasson & Gitler

[57] ABSTRACT

A modular furniture construction system employing a main body element consisting of a longitudinal element as well as two secondary body elements extending transversely from the longitudinal element. Each of the secondary body elements is provided with a key-shaped guiding hole in which a fastening device is inserted adapted to join two main body elements together. These main body elements can be joined together in a number of different ways to form, along with one or more support element, various pieces of furniture, such as chairs, tables, desks shelves and other similar devices.

7 Claims, 11 Drawing Sheets

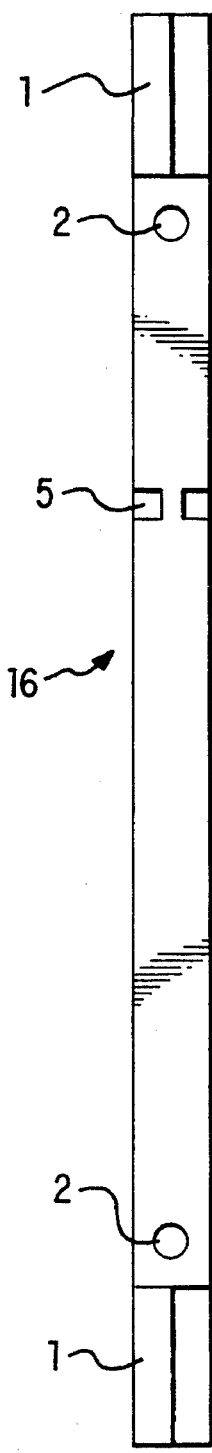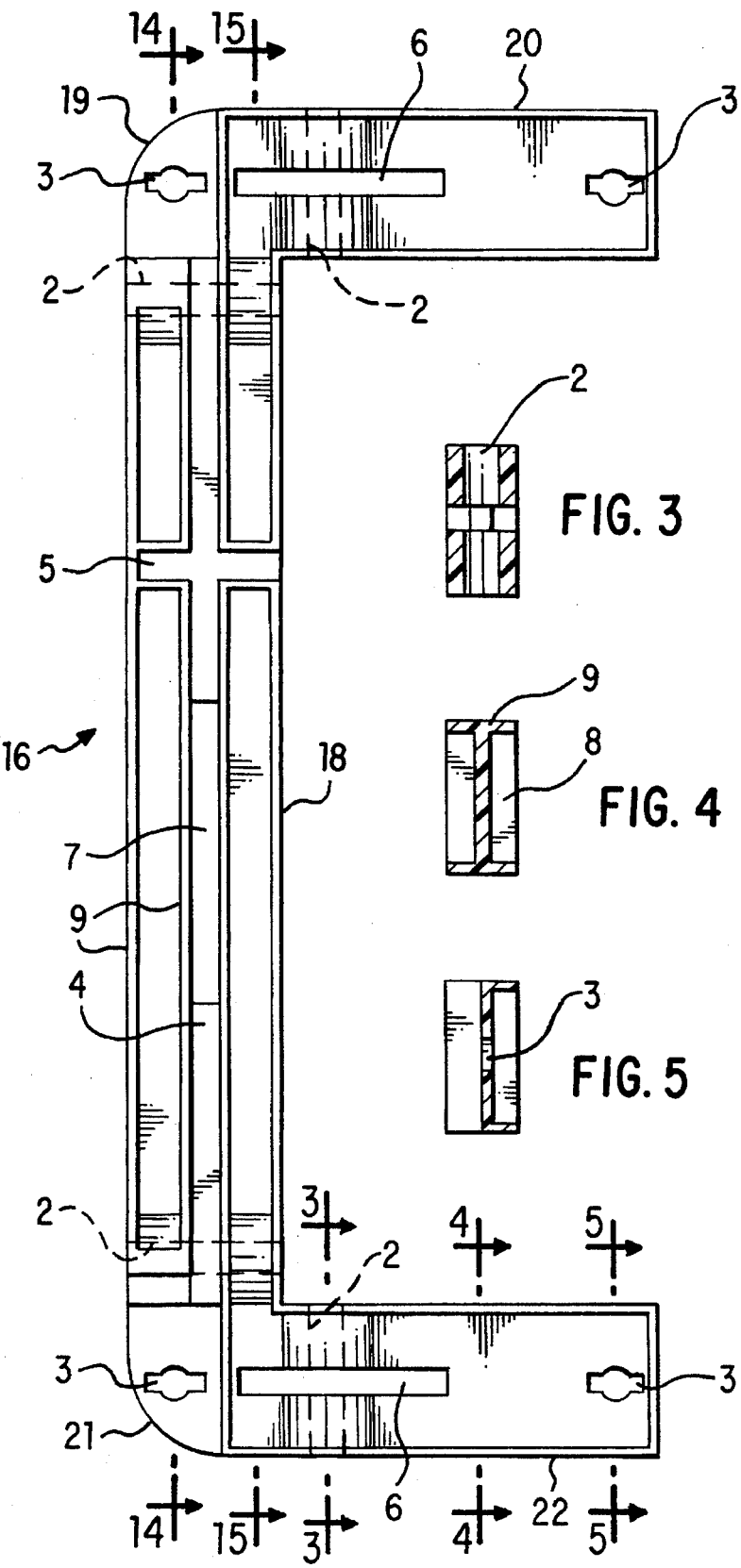
FIG. 1
FIG. 2
FIG. 3
FIG. 4
FIG. 5

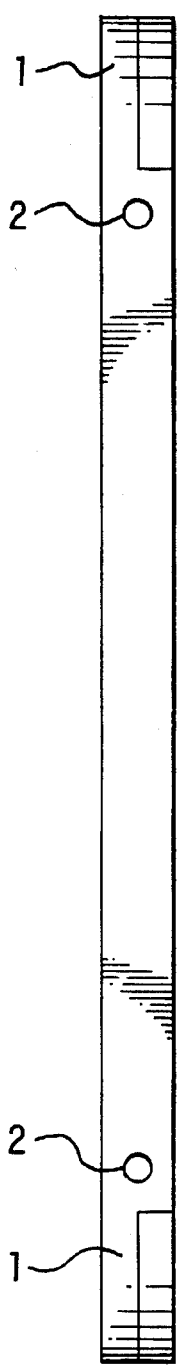
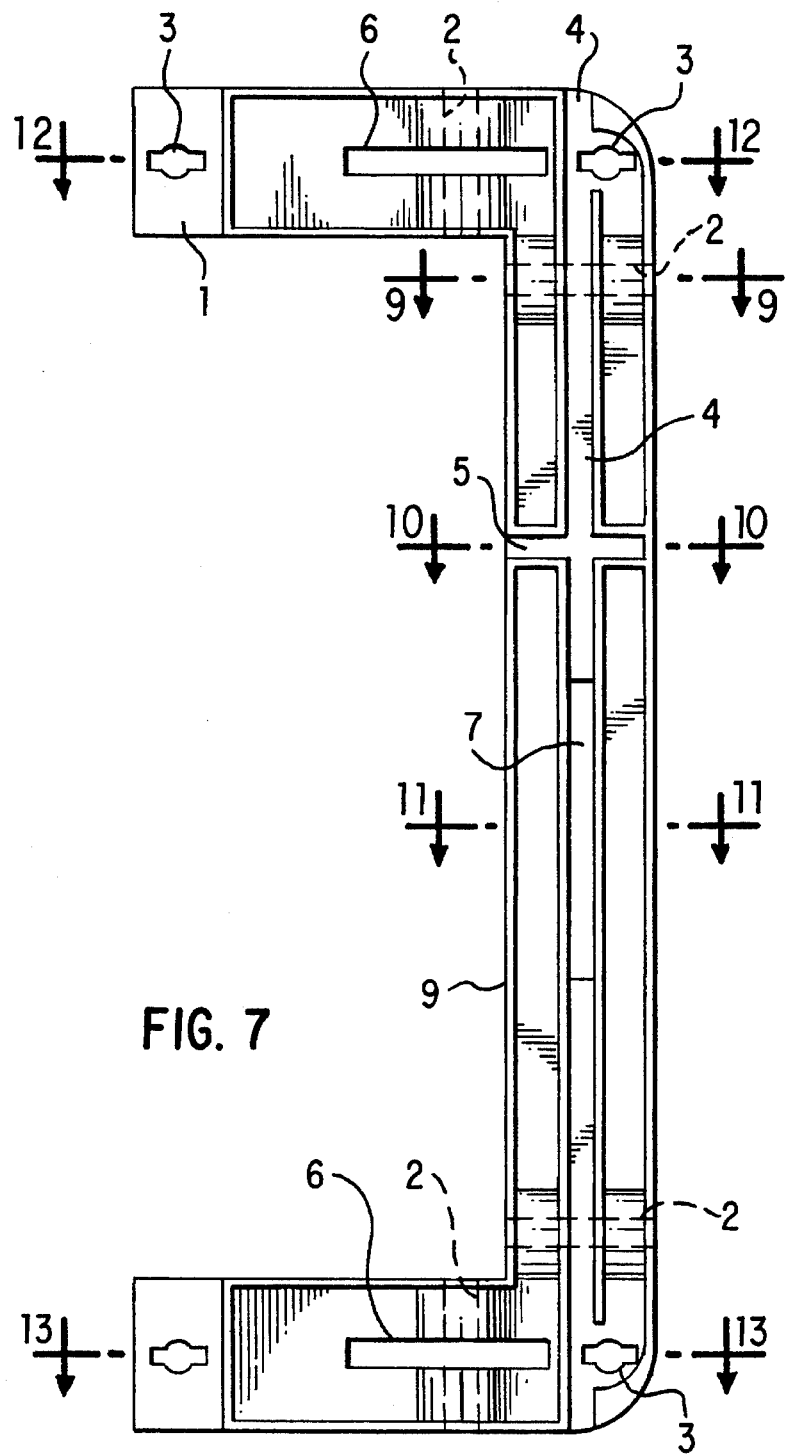
FIG. 6
FIG. 7
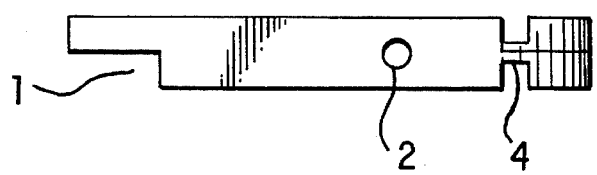
FIG. 8

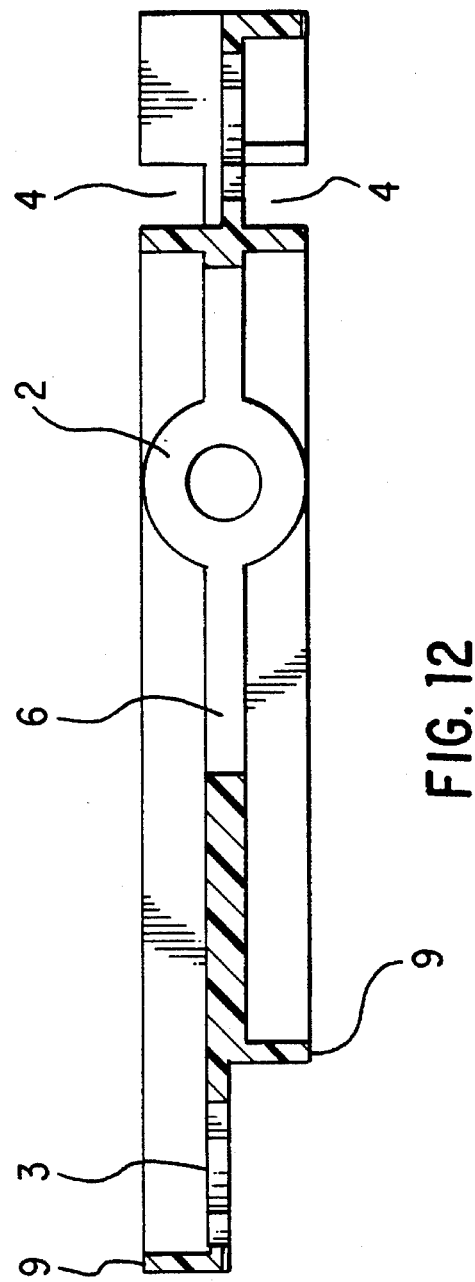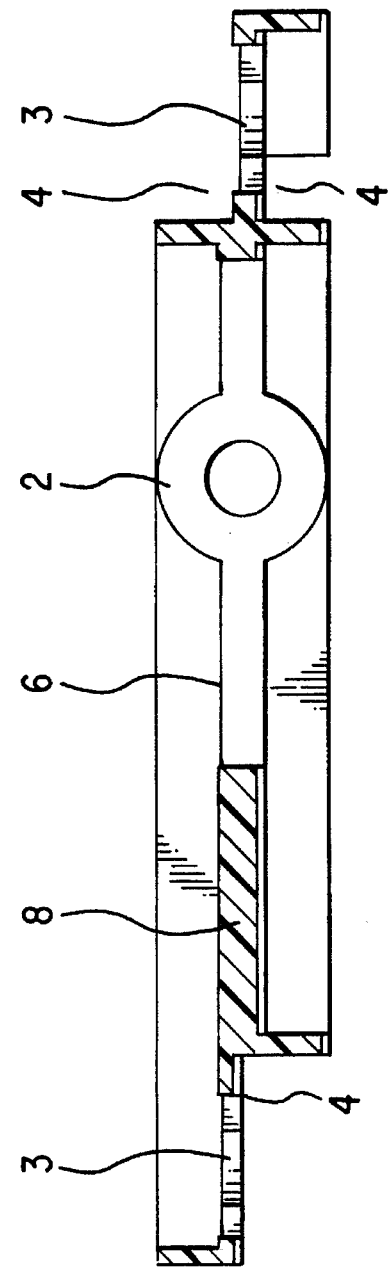

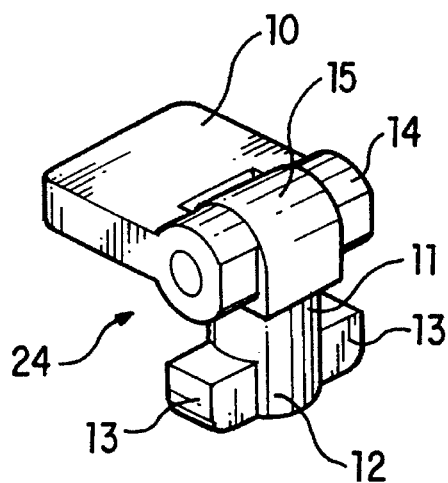
FIG. 20A
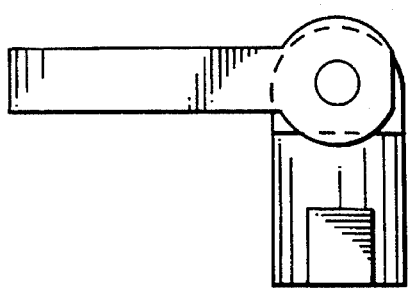 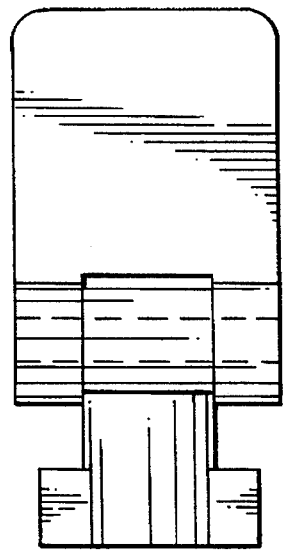 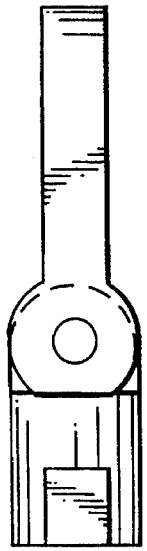
FIG. 20B    FIG. 20C    FIG. 20D

MODULAR FURNITURE CONSTRUCTION

BACKGROUND OF THE INVENTION

Field of the Invention

The present invention relates to a furniture module utilizing a relatively small number of elements to construct various pieces of furniture, such as chairs, work tables, screens, blackboards, moveable costume hangers and the like, by joining the relatively small number of construction pieces together in different manners.

The simplicity of the construction of the various pieces of furniture would allow even preschool-aged children to construct various furniture pieces from the relatively small number of elements.

SUMMARY OF THE INVENTION

The present invention provides a constructed module of furniture, such as a main element, to which is added a secondary element, referred to as the fastening element, whose function is to fasten various modules together. A planar or support element can be used in conjunction with the main element and the fastening element to construct many different types of furniture, such as tables, chairs, desk, lecterns, shelves, stages and screens, to name a few.

The module, hereinafter referred to as the main element, is similar to an elongated "C" in appearance and is provided with a longitudinal main body and two, shorter transverse bodies extending laterally from the ends of the main body. The longitudinal body portion of the main element is provided with two rounded corners to avoid possible injury to the user. The main element is provided with a number of ribs, grooves, slots and guiding holes, in order to reduce, to the minimum, the amount of material used to construct the main element, thereby saving costs without compromising the rigidity of the main element as well as its ease of function. The general configuration of the main element would facilitate joining the main element to various other main elements, support elements and fastening elements. Furthermore, the inclusion of the various grooves, slots, guiding holes, ribs and the like assists in construction of the various types of furniture to be assembled.

Located on both faces of the main element are two grooves; one, a longitudinal groove, traverses the entire length of the main body portion, and is utilized for fixing supporting and guiding drawers and rigid platforms, such as shelves and other furniture, to the main element. The second groove transverses the main body portion and is similar to the longitudinal groove in function, and is used with various platforms, such as the seat of a chair or the board of a screen. These platforms are joined to the main element by sliding them into either the longitudinal groove or the transverse groove.

Similarly, each of the transverse bodies is provided with a single slot, and the main body element is also provided with a slot approximately in the middle thereof. All of these slots make it possible to join various main elements together using additional rigid elements which can be slid into these slots.

Two axial guides are located on the main body element, and one on each of the transverse elements, to allow various guide elements, such as pins or bolts, to be used to join the main element to tabletops, stage platforms and the like, provided above the main elements, by introducing bolts or through pins into the holes. Additionally, the axial guides are used as receptacles for the wheels of the furniture which is assembled to be moving, such as moveable costume hangers or screens.

Each of the main elements can be joined to similar elements utilizing one or more of the four key lock-shaped guiding holes provided thereon. These guiding holes are located on seats and are used to affix two of the elements together, employing the fastening element.

Each of the fastening elements includes a cylindrical tower having a guiding hole thereon for a through pin in its top end and two nails in its bottom end, giving it a key-type shape. The fastening element also includes a pin as well as a lever which rotates around the cylindrical tower through the pin.

Two of the main elements are joined together by aligning one of the guiding holes of one element to one of the guiding holes of a second element. The fastening element is then passed through each of the guiding holes and then rotated until the nails of the cylindrical tower are engaged to the main element wall. Finally, the lever is rotated downward to join the main elements together.

The various construction elements used to construct various pieces of furniture are easy to handle and to store. Furthermore, the furniture can be easily disassembled, which would reduce packing and freight costs.

BRIEF DESCRIPTION OF THE DRAWINGS

The previously related objects and functions of the present invention will be described in conjunction with various drawings in which:

FIG. 1 is a front elevational view of the main element of the present invention;

FIG. 2 is a right side elevational view of the main element of the present invention;

FIG. 3 is a sectional view taken along lines 3—3 of FIG. 2, showing the horizontal slots of the main element;

FIG. 4 is a sectional view taken along lines 4—4 of FIG. 2, showing the central rib of the main element;

FIG. 5 is a guide hole of the main element, shown in a sectional view, taken along lines 5—5 of FIG. 2;

FIG. 6 is a rear elevational view of the main element of the present invention;

FIG. 7 is a left side elevational view of the main element of the present invention;

FIG. 8 is a top view of the main element of the present invention;

FIG. 12 is a sectional view taken along lines 12—12 of FIG. 7;

FIG. 13 is a sectional view taken along lines 13—13 of FIG. 7;

FIGS. 20A, 20B, 20C and 20D show various views of the fastening element;

DETAILED DESCRIPTION OF THE INVENTION

Figure 18:
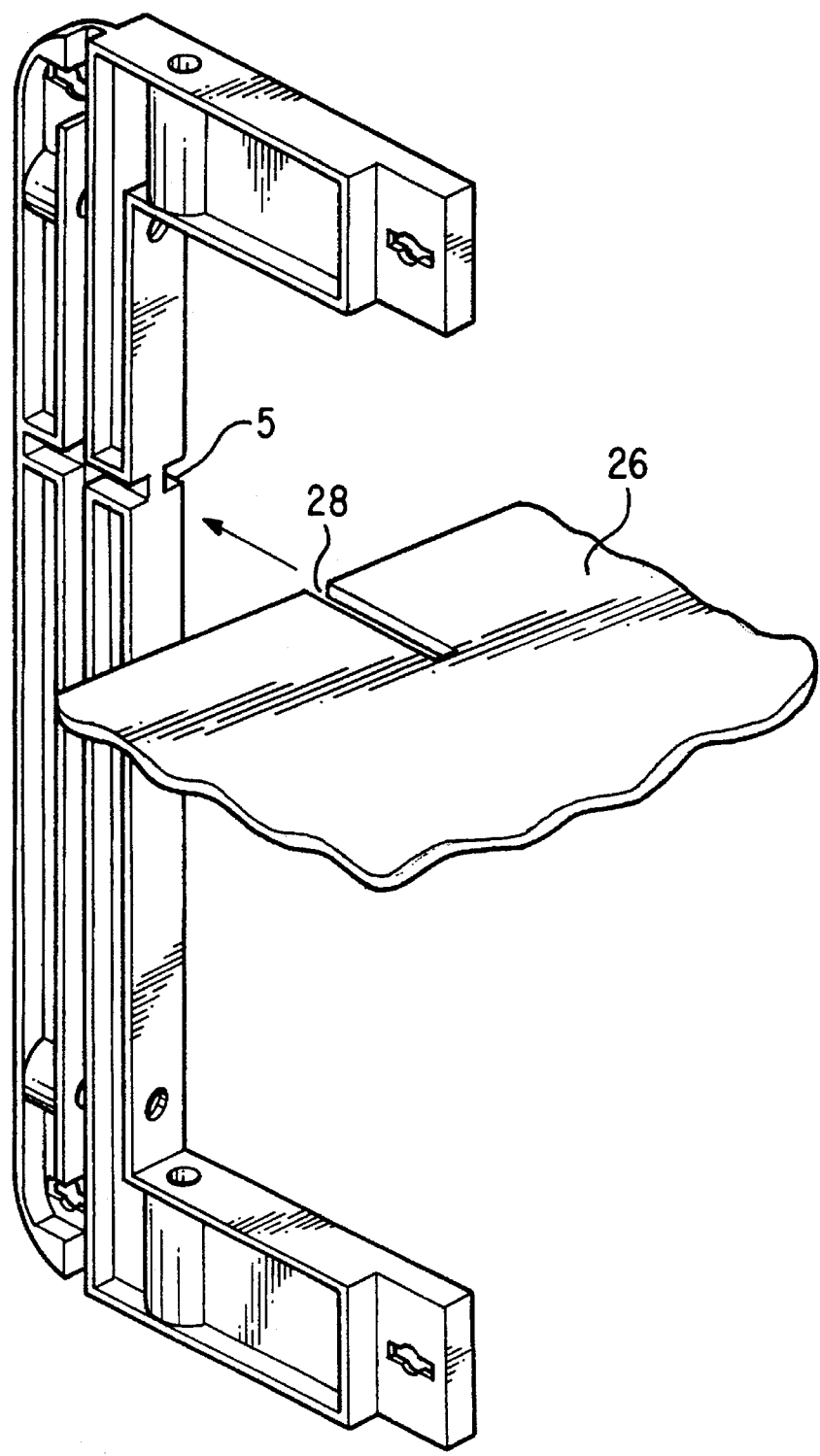
FIG. 18 is a perspective view of the main element showing a support piece being inserted into the transversal groove of the element.
Figure 19A:
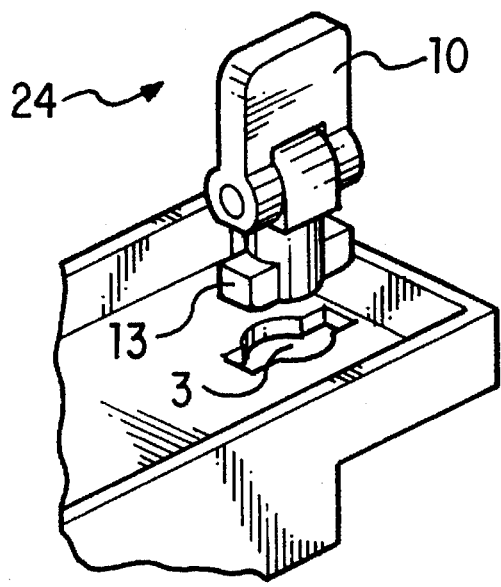
FIGS. 19A, 19B, 19C and 19D are perspective views showing the steps of fastening the fastening element to the main element.
Figure 19B:
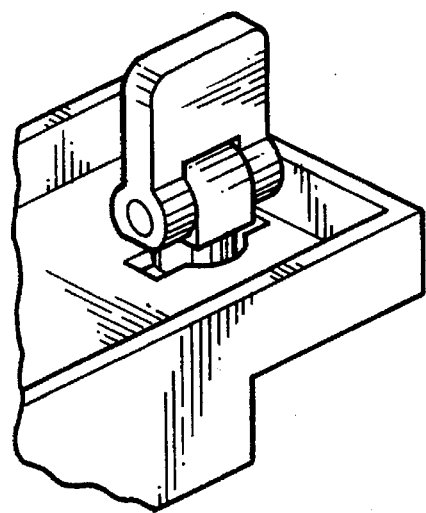
Figure 19C:
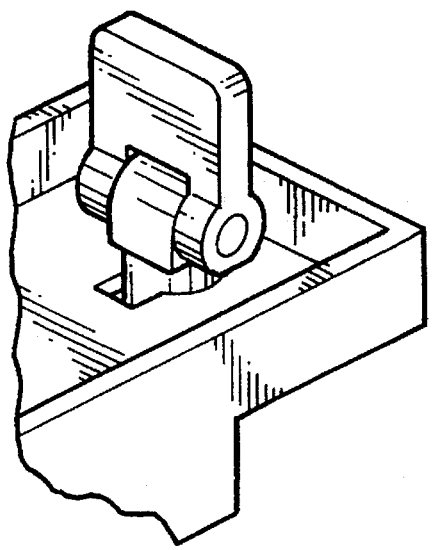
Figure 19D:
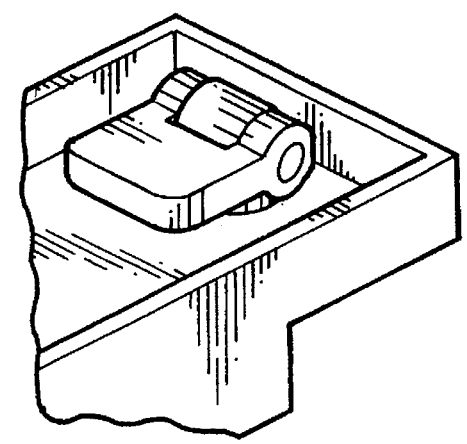

As shown in the drawings, the present invention can be utilized to produce a multitude of different furniture designs using only a relatively small amount of construction pieces. More specifically, the present invention employs a main element 16 (see FIGS. 1 and 2) as well as a fastening element 24 (see FIGS. 19 and 20) for connecting two of the main elements 16 together. These elements 16 and 24 can be used with a plurality of support or planar elements 26 (See FIG. 18) which are used to produce different pieces of furniture, such as chairs, tables, platforms and the like.

The main element 16 is constructed primarily in the shape of an elongated "C" provided with a longitudinal section 18 as well as two relatively short sections 20,22 which are transverse to the longitudinal section 18. Rounded corners 19,21 are provided between the longitudinal section 18 and the transverse sections 20,22 to avoid injury. A central rib 8 extends along the length of the longitudinal portion 18 (see FIGS. 4, 13, 14 and 15) and gives rigidity to the main element 16 in combination with a secondary rib 9 which extends along the edge of the main element 16 as well as along part of the edges of the portions 20,22. These ribs 8 and 9 are used to save material in the construction of the present invention to allow the present invention to be as inexpensive as possible.

The distal portions of each of the sections 20,22 which extend beyond the rib portion 9, would then be recessed from the outer periphery of the main element 16 to form a seat 1. These portions are utilized as supports when joining two of the main elements 16 together. Each of these seating sections is provided with a guiding hole 3 into which the fastening elements 24 will be inserted. Two additional guiding holes 3 are provided in the rounded corner portions 19,21 provided between the longitudinal portion 18 and the two transverse portions 20,22.

Figure 21:
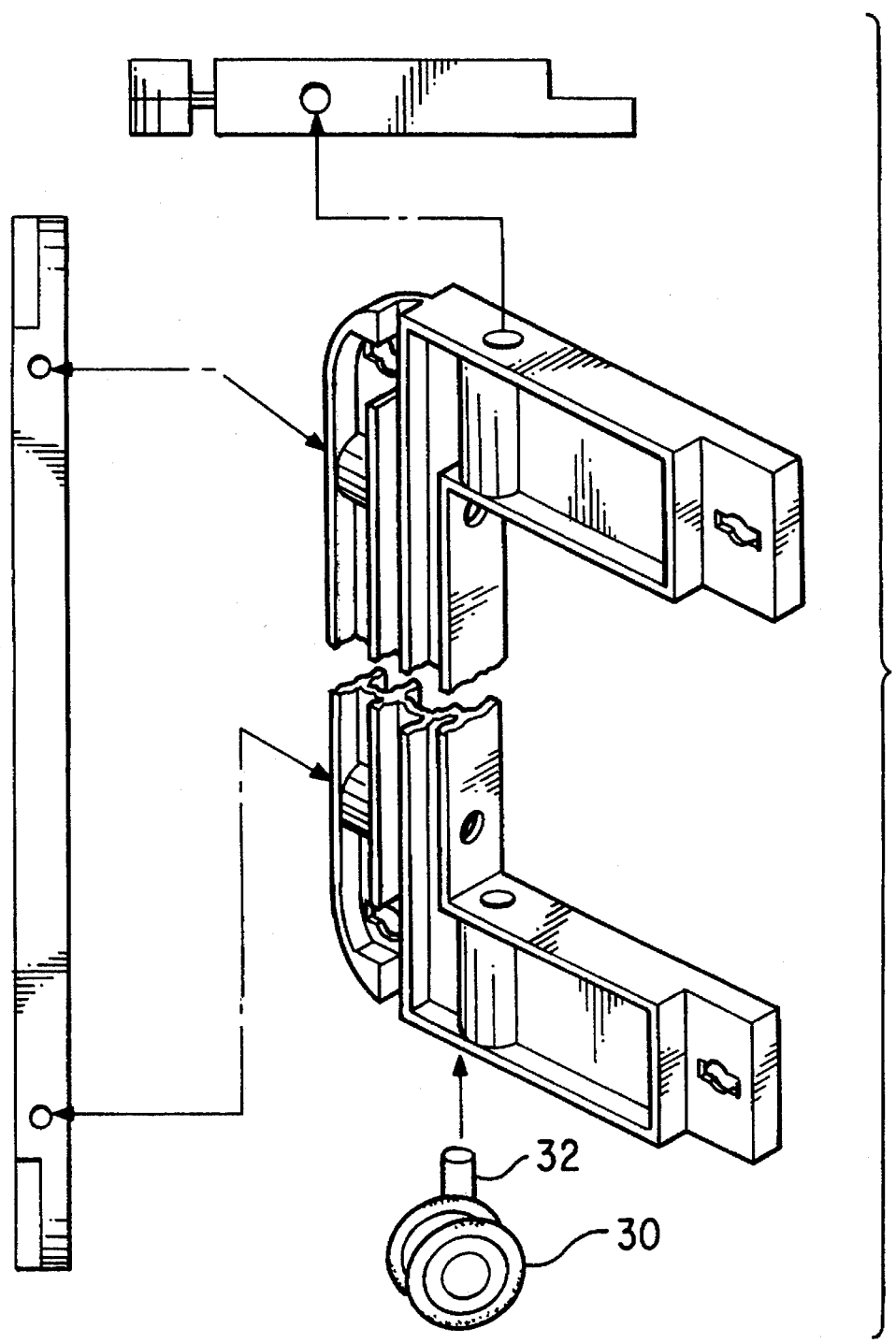
FIG. 21 is a perspective, rear and top view of the main element of the present invention, showing four axis guides which are receptacles of wheels, pins or bolts.

Axial guide holes 2 are located on either side of the rounded corner portions 19,21, the guide holes extending completely through the main element 16. These axial guide holes 2 are utilized as receptacles for various wheels 30 having a rigid member 32 extending therefrom (see FIG. 21). These wheels will be utilized when the constructed furniture is a moveable costume holder, a mobile screen or the like, allowing the furniture to be moved. Alternatively, these axial guide holes can be used as receptacles for pins or bolts at fixed platforms to form support surfaces such as tabletops or stages.

A first guide groove 5 traverses the longitudinal portion 18 of the main element 16, and is located at both exterior faces of the longitudinal portion 18. This groove 5 is utilized to support platforms 26, such as the seat of a chair or the board of a screen (see FIG. 18). A slot 28 is provided in the platform 26 to extend into the groove 5.

A second groove 4 extends between two of the secondary ribs 9, which longitudinally extend in the longitudinal portion 18, as shown in FIGS. 2 and 7. This groove 4 is used in combination with various platforms that operate as shelves or tops for joining two main elements together. A vertical slot 7 is used to slide a portion of the platform therethrough and into engagement with the groove 4.

Horizontal slots 6 are provided in each of the portions 20,22. These slots 6 provide, with the use of narrow platforms, more rigidity to the coupling main elements. This is made possible by introducing the ends of the various platforms into the slot 6 and sliding its gridwork until it is secured into the main element.

FIGS. 20A, 20B, 20C and 20D illustrate the fastening element 24 of the present invention. The fastening element consists essentially of a tower 11 having a lower cylindrical body 12 as well as a top portion 15 through which a pin 14 is inserted. This pin is provided between two arms of a lever member 10 which rotates around the tower 11. Two lower sections 13 are attached to the cylinder 12 to form a key shape which is similar to the shape of the guiding holes 3.

Figure 9:
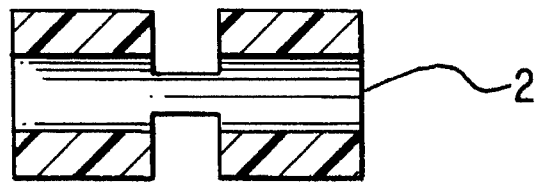
FIG. 9 is a sectional view of the axis guide of the main element taken along lines 9—9 of FIG. 7.
Figure 10:
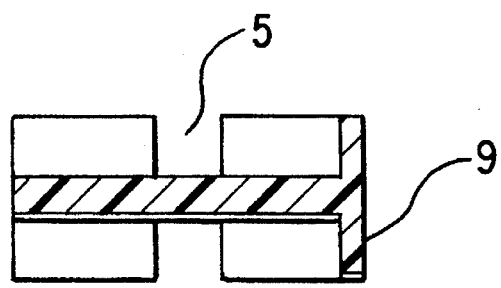
FIG. 10 is a sectional view taken along lines 10—10 of FIG. 7, showing the transversal guide groove and a secondary rib.
Figure 11:
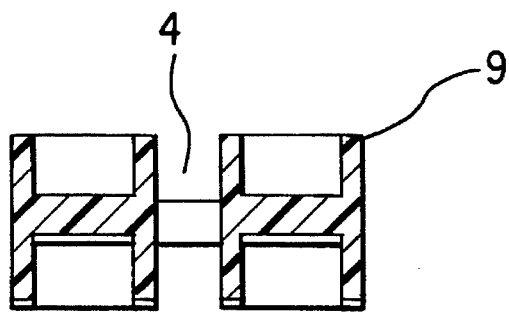
FIG. 11 is a sectional view taken along lines 11—11 of FIG. 7, shown the longitudinal guide groove and a secondary rib.
Figure 14:
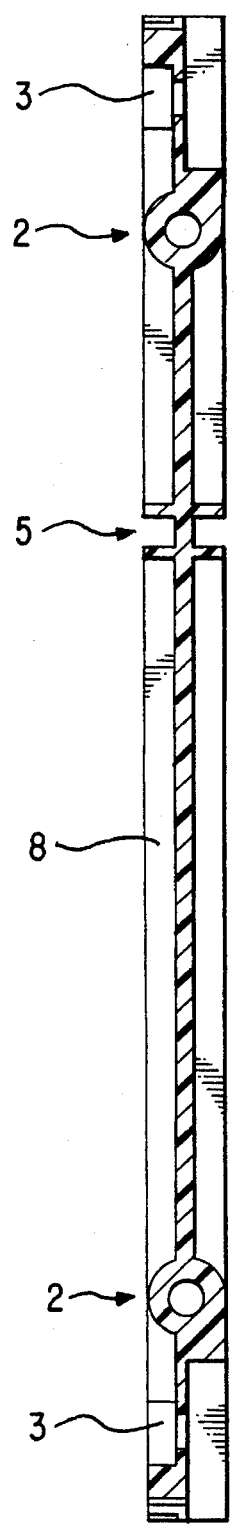
FIG. 14 is a sectional view taken along lines 14—14 of FIG. 2.
Figure 15:
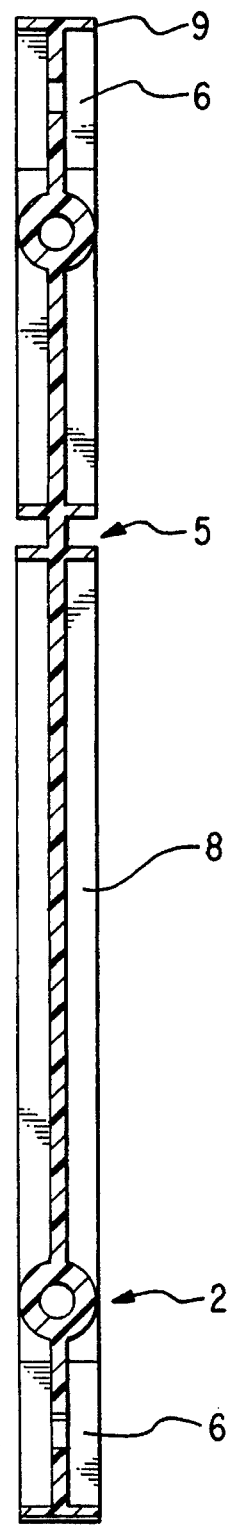
FIG. 15 is a sectional view taken along lines 15—15 of FIG. 2.
Figure 16:
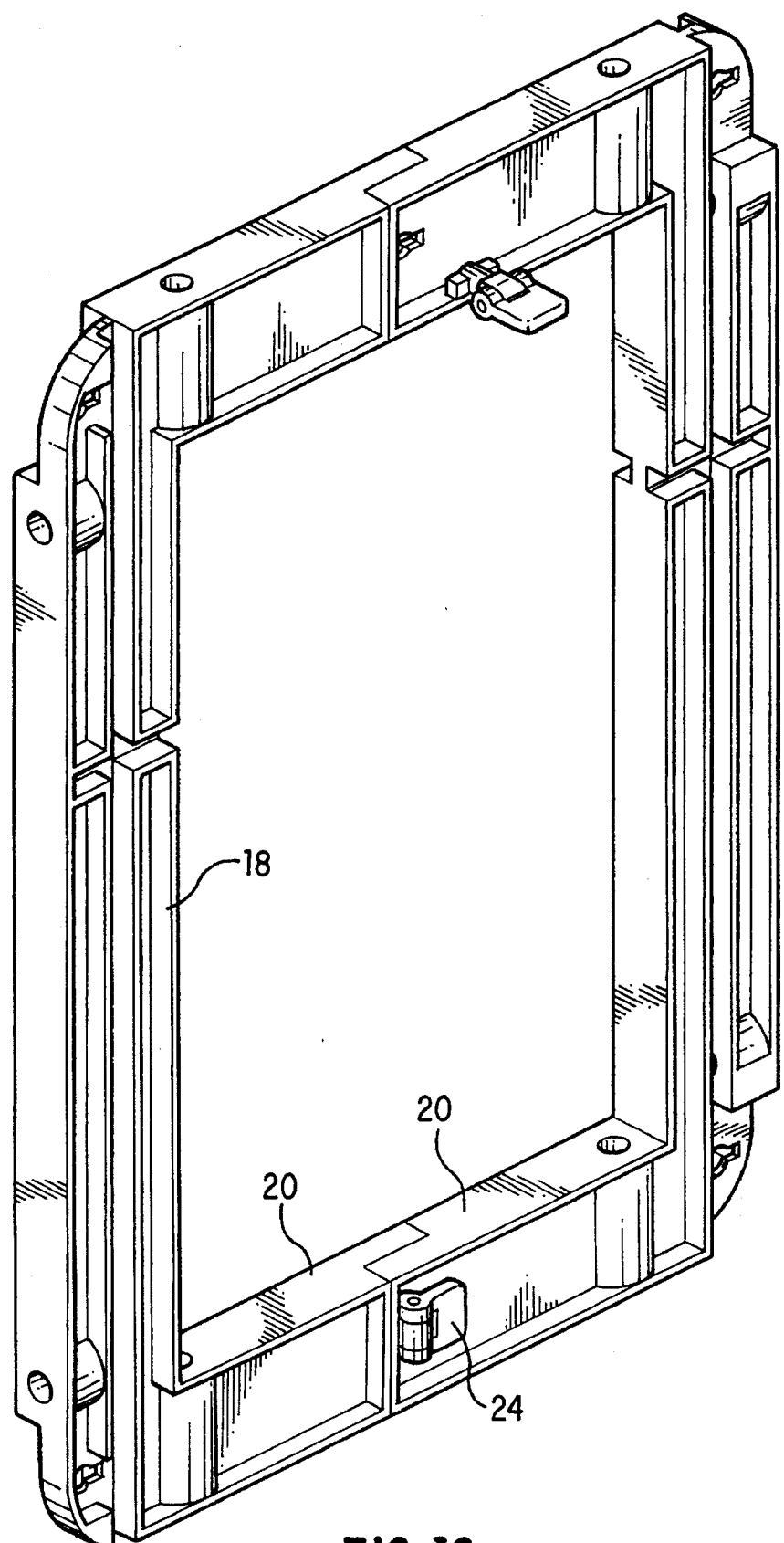
FIG. 16 is a perspective view showing two main elements fastened together.

The method of affixing two main elements together utilizing the fastening element 24 is shown in FIGS. 16 and 19. Initially, transverse elements 20 of two main elements 16 are joined together utilizing the recessed seat 1 of each of the transverse members 20. In this manner, the guiding hole 3 of each of the seats 1 is aligned. Thereafter, with the lever portion 10 of the fastening member 24 in a raised position, bottom elements 13, when they are properly aligned with the slots in the guiding hole 3, are inserted into the guiding hole 3 of one main element 16, as well as a second main element (see step 2). At this point, the lever element is rotated 90° to the left or to the right until the bottom elements 13 engage the element wall (see step 3). Finally, as shown in step 4, the lever element 10 is lowered to maintain pressure over the walls of the transverse member 20 to ensure that both of the main elements are joined together.

Figure 17:
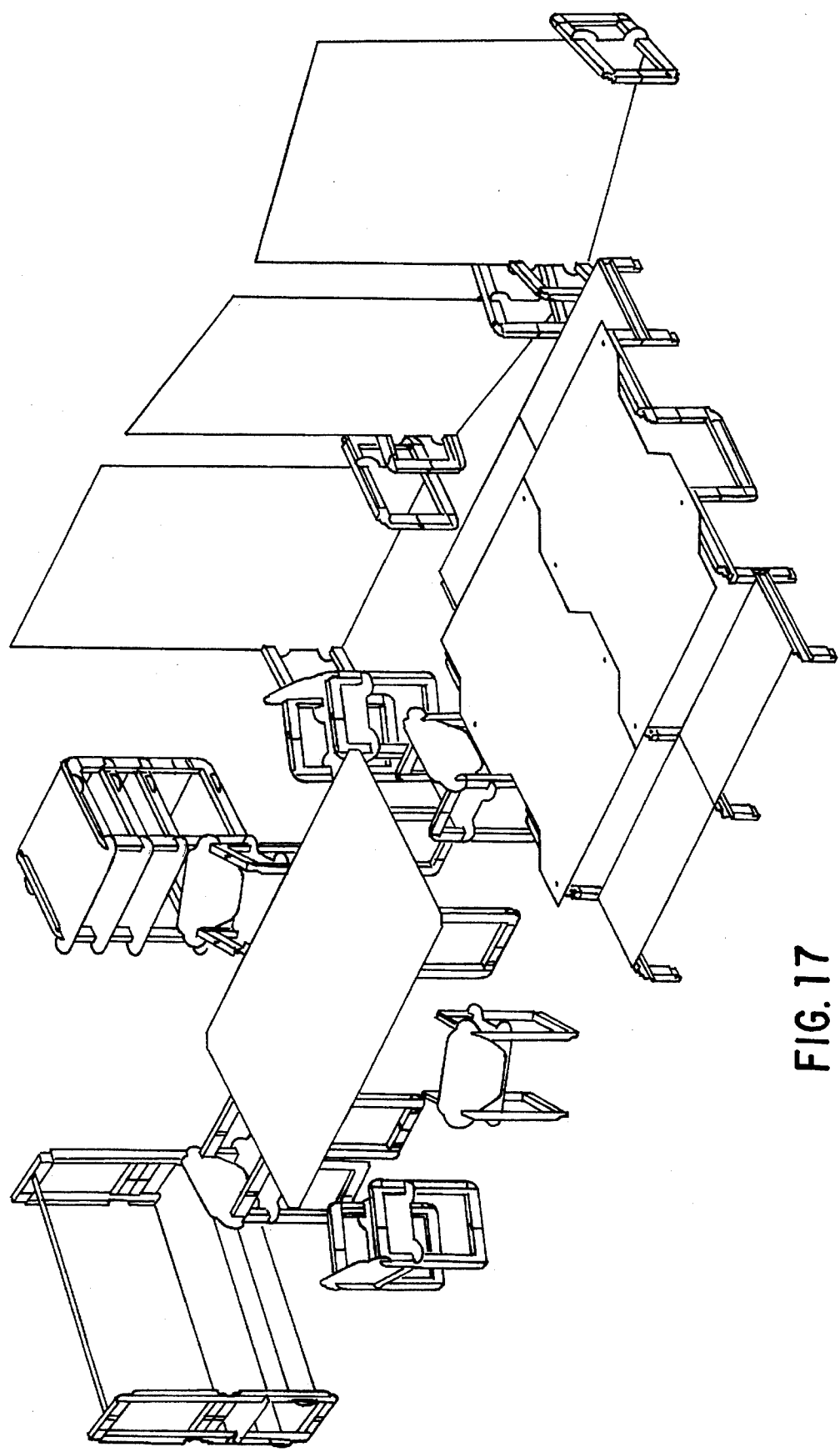
FIG. 17 is a perspective view showing various pieces of furniture which can be constructed according to the present invention.

FIG. 17 illustrates various types of furniture which can be constructed utilizing the construction elements of the present invention as described. As shown, chairs can be constructed employing the construction elements of the present invention, as well as a bottom support surface and a back support surface. Additionally, a table can be constructed utilizing a support surface provided over a plurality of pairs of main elements. A costume or clothes hanger can be constructed employing four pairs of main elements, two of which are affixed to the top of another pair of elements. A longitudinal pole extends between the tops of two pairs of main elements. Additionally, a shelving unit can be created using two pairs of opposed main elements provided with a number of shelving units. A stage can be developed using a number of main elements as the base of the stage as well as a number of support platforms. Finally, FIG. 17 shows a plurality of screens created by affixing support elements to pairs of opposed main elements.

The invention has been described with reference to the illustrated and presently preferred embodiments. It is not intended that the invention be unduly limited by this disclosure of the presently preferred embodiments. Instead, it is intended that the invention be defined by the means, and their obvious equivalents, set forth in the following claims:

What is claimed is:

1. A modular furniture construction system comprising:
   at least two main body elements each comprising a single longitudinal section having first and second ends and first and second secondary body elements, each of said first and second secondary body elements extending transversely from said first and second ends of said longitudinal section, respectively, each of said first and second secondary body elements provided with a recessed seating surface and a key-shaped guiding hole provided in said recessed seating surface and extending completely therethrough; and
   a fastening device for joining one main body element to a second main body element, said fastening device comprising a cylindrical section provided with a base section corresponding in shape to said key-shaped guiding hole, and a top section provided with a first hole extending therethrough, said cylindrical section and said base section inserted into one said guiding hole of said main body element and said second one main body element for rotation therein, said fastening device provided with a lever member and a pin inserted into said first hole and said lever member to provide rotation of said lever member in a plane orthogonal to the plane of rotation of said cylindrical section.

2. The modular furniture construction system in accordance with claim 1, provided with first and second ribs extending around the periphery of said main body element.

3. The modular furniture construction system in accordance with claim 1, provided with a longitudinal groove included in said single longitudinal section to support a support surface thereagainst.

4. The modular furniture construction system in accordance with claim 1, further including a groove extending through said single longitudinal section for co-acting with a slot provided in a support surface.

5. The modular furniture construction system in accordance with claim 1, provided with a plurality of slots in said single longitudinal section and said first and second secondary body elements through which a support surface can extend.

6. The modular furniture construction system in accordance with claim 1, further including key-shaped guiding holes provided in said single longitudinal section.

7. The modular furniture construction system in accordance with claim 1, provided with cylindrical guiding holes in said first and second secondary body elements.

* * * * *